United States Patent Office 3,379,714
Patented Apr. 23, 1968

3,379,714
BASIC DISAZO INDAZOLIUM DYESTUFFS
Marie-Josephe Jeanne Alicot, Soisy-sous-Montmorency, and Robert Frederic Michel Sureau, Enghien-les-Bains, France, assignors to Etablissements Kuhlmann, Paris, France
No Drawing. Filed Nov. 18, 1964, Ser. No. 412,251
Claims priority, application France, Nov. 22, 1963, 954,661; Sept. 7, 1964, 987,296
11 Claims. (Cl. 260—160)

ABSTRACT OF THE DISCLOSURE

This invention concerns basic disazo dyestuffs having one of the general formulae:

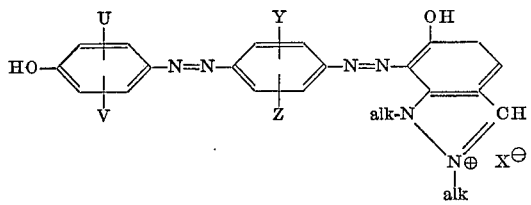

and

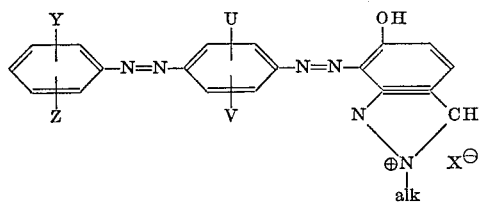

wherein U and V each represent a member selected from the group consisting of the hydrogen atom and the methyl and methoxy groups, Y and Z each represent a member selected from the group consisting of hydrogen and chlorine atoms and the methyl, methoxy and nitro groups, alk represents a member selected from the group consisting of the methyl and ethyl groups and $X^\ominus$ represents a monovalent anion.

The present invention concerns improvements in and relating to new basic disazo dyestuffs.

In particular it relates to new dyestuffs of the general formula:

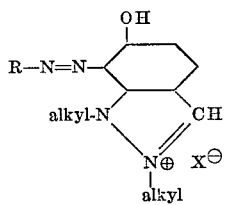

in which R represents a hydroxybenzene-azobenzene radical of the formula:

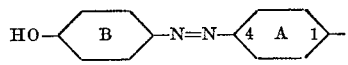

or a benzene-azobenzene of the formula:

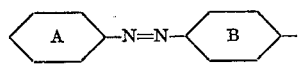

the nucleus A being able to be substituted by a chlorine atom or a methyl, alkoxy or nitro group, the nucleus B being able to be substituted by alkyl or alkoxy groups, the alkyl groups in the $N_1$ or $N_2$ positions of the indazole nucleus are groups of low molecular weight, preferably methyl or ethyl groups, and X represents a monovalent anion.

The dyestuffs of Formula I in which R represents a hydroxybenzene-azobenzene residue of Formula a which for convenience we shall refer to as dyestuffs of Formula Ia, may be prepared in several different ways.

A preferred method comprises coupling the diazo derivative of a substituted aniline of the formula

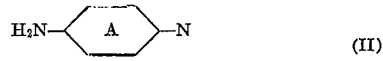

with a 1,2-dimethyl-6-hydroxy-indazolium salt in aqueous alkaline solution. In Formula II, Y represents a nitro or acylamino group, and the possible substituents of the nucleus A are the same as before.

There is thus obtained a monoazo dyestuff of the formula:

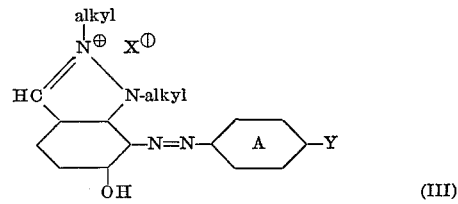

The group Y can be converted into an amino group by reduction or hydrolysis by known processes, the aminoazo compound thus obtained is diazotised, and the diazo derivative formed is coupled with the coupling compound

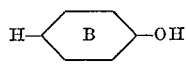

that is, with phenol or one of its derivatives substituted by alkyl or alkoxy groups in the ortho or meta position to the hydroxyl group. The coupling is effected in an aqueous alkaline medium. When it is finished, the medium is made acid so as to isolate the disazo dyestuff of Formula Ia.

Another method of preparation of the dyestuffs of Formula Ia comprises coupling the diazo derivative of a base of Formula II with the precipitated phenolic coupling compound

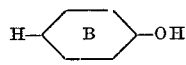

The azo compound obtained is subjected either to a careful reduction or to hydrolysis, according to known processes, in order to convert the group Y into an amino group. The aminoazo compound (IV) thus prepared

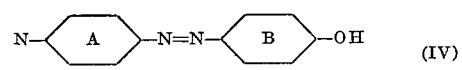

is diazotized and the diazo derivative is coupled with a 1,2-dialkyl-6-hydroxy-indazolium salt in aqueous alkaline solution. The reaction mixture is then made acid in order to isolate the disazo dyestuff of Formula Ia.

A third method of preparation of the dyestuffs of Formula Ia comprises subjecting the disazo dyestuffs of the formula:

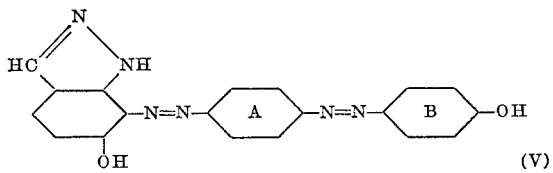

to the action of alkylating agents, possibly in the presence of anhydrous organic solvents.

Suitable alkylating agents are, for example, the alkyl halides, dialkyl sulphates and alkyl arylsulphonates. Solvents which may be used are, for example, benzene, toluene, xylenes, chlorobenzene, o-dichlorobenzene, nitrobenzene, chloroform and dimethyl formamide. The dyestuffs of Formula V may be prepared by coupling diazo derivatives of the dyestuffs of Formula IV with 6-hydroxy-indazole in aqueous alkaline medium. It is also possible to couple the diazo derivative of a base of Formula II with 6-hydroxy-indazole, in aqueous alkaline medium, to form the azo compound of formula:

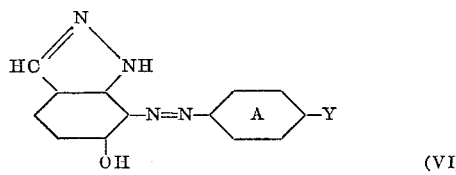

reduce or hydrolyse the group Y, diazotise the aminoazo compound thus obtained and couple this diazo derivative with the phenolic coupling compound

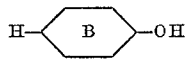

defined above.

A fourth method of preparation of the dyestuffs of Formula Ia comprises making the quaternary compounds of the dyestuffs of Formula VI under the same conditions as the dyestuffs of Formula V. Dyestuffs of Formula III are thus obtained and one then proceeds as in the first method described above.

The dyestuffs of Formula I in which R represents a benzene-azobenzene residue of Formula b which for convenience we will refer to as dyestuffs of Formula Ib may be advantageously obtained by coupling, an aqueous solution, 1,2-dialkyl-6-hydroxy-indazolium salts with the diazo derivative of the compound of formula:

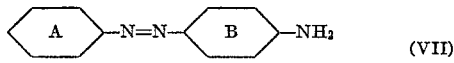

in which the possible substituents of the nuclei A and B are the same as before.

The dyestuffs of Formula Ib can also be prepared by making the quaternary compounds, as described above, of the disazo dyestuffs of the formula:

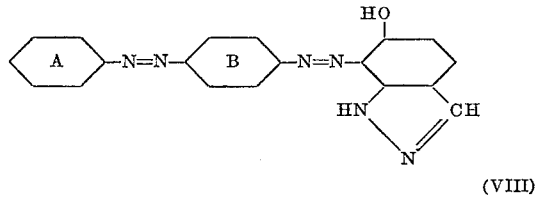

themselves prepared by coupling the diazo derivative of the dyestuffs of Formula VII with 6-hydroxy-indazole.

The dyestuffs of Formula I which are generally very soluble, possess the tinctorial properties of basic dyestuffs but are of particular interest for dyeing fibers of acrylonitrile polymers or copolymers, to which they impart full-bodied shades, which are very even and fast, especially to light and to subsequent shaping treatments. The range of shades obtained extends from bright orange to bordeaux, passing through scarlet and more or less brownish reds.

The association between fibre and dye may be represented by the scheme: fibre $\ominus{-}\oplus$ indazolium azo dye.

In the following examples, which are purely illustrative and to which the invention is not restricted, the parts are parts by weight unless the contrary is indicated.

Example 1

25 parts of N-monoacetyl p-phenylenediamine are dissolved in 200 parts of water and 30 parts by volume of 10 N hydrochloric acid. The solution is cooled to 5° C. and a solution of 7 parts of sodium nitrite in 50 parts of water is added. At the end of 20 minutes, the solution of the diazo derivatives is introduced into a solution of 20 parts of 1,2-dimethyl-6-hydroxy-indazolium chloride in 200 parts of water. The mixture is stirred and dilute ammonia is progressively added until slight alkalinity is obtained (pH about 7 to 8). When the diazo derivative has disappeared, the precipitate is filtered off, briefly rinsed, drained and made into a paste in 140 parts of 5 N hydrochloric acid. The mixture is refluxed for an hour and then allowed to cool. The intermediate amino dyestuff crystallises, and is filtered off, drained and dried at about 70° C. to 80° C. Weight obtained: 24 parts.

16 parts of this dyestuff are dissolved in 250 parts of water. 12.5 parts by volume of 10 N hydrochloric acid are added, the mixture cooled to 5–10° C., and diazotised by the introduction of a solution of 3.5 parts of sodium nitrite in 10 parts of water. After stirring for half an hour, 8.5 parts of crystalline sodium acetate are added to the solution of the diazo derivative, then this solution is introduced into 50 parts of water containing 5 parts of phenol and 5 parts of 10 N caustic soda. Then ammonia is gradually introduced until the pH is about 7 to 8. The coupling process is rapidly completed. The reaction mixture is heated to 50–60° C. and made acid by the addition of hydrochloric acid. After cooling, it is filtered and the product drained and dried in an oven. Dry weight: 20 parts.

A solution of 0.5 part of this dyestuff in 200 parts of water is prepared, and 2 parts of acetic acid at 60 g. per litre and 0.5 part of a condensation product of castor oil with ethylene oxide are added. 100 parts of fibres based on acrylonitrile polymer are introduced at 50° C., and the bath is taken progressively to boiling point and maintained at this for an hour and a half. A full-bodied orange-brown shade is obtained, which has excellent general fastness, especially to light.

Example 2

29 parts of the dyestuff obtained by coupling the diazo derivative of 2 - chloro - 4 - amino - N - acetylaniline with phenol are heated under reflux for 2 hours in a mixture of 200 parts of water and 100 parts by volume of concentrated hydrochloric acid. The mixture is allowed to cool, and the precipitate is filtered off and then made into a paste in 300 parts of water and 25 parts by volume of 10 N hydrochloric acid, and diazotised by the addition of a solution of 7 parts of sodium nitrite in 30 parts of water at a temperature of 5–10° C. After stirring for half an hour the diazo derivative is introduced into a solution of 20 parts of 1,2-dimethyl-6-hydroxy-indazolium chloride dissolved in 200 parts of water. The mixture is stirred and made slightly alkaline (pH about 7 to 8) by the slow addition of ammonia. When the coupling is completed, the reaction mixture is heated to 50–60° C. and made acid by the addition of hydrochloric acid. It is allowed to cool, and the precipitate is filtered off, drained and dried in an oven. The dyestuff obtained dyes fibres based on polymers or copolymers of acrylonitrile a red-brown shade having excellent general fastness.

A number of other analogous examples are summarised in the following table. The position of the substituents of the nucleus A is according to the numbering given by the Formula a.

| Ex. | Substituents of A | H—B—OH | Shades on acrylic fibers |
|---|---|---|---|
| 3 | | o-Cresol | Red brown. |
| 4 | | m-Cresol | Do. |
| 5 | | 2,5-dimethyl-phenol | Do. |
| 6 | | 2,6-dimethyl-phenol | Do. |
| 7 | | 3-methoxyphenol | Bordeaux brown. |
| 8 | 3-methyl | Phenol | Red brown. |
| 9 | do | o-Cresol | Do. |
| 10 | do | m-Cresol | Do. |
| 11 | do | 2,5-dimethyl-phenol | Do. |
| 12 | do | 2,6-dimethyl-phenol | Do. |
| 13 | 2-chloro | o-Cresol | Brick red. |
| 14 | 3-chloro | Phenol | Orange brown. |
| 15 | 2-methoxy | do | Bordeaux. |
| 16 | 2-methyl-5-methoxy | do | Violet brown. |
| 17 | do | o-Cresol | Do. |
| 18 | do | m-Cresol | Do. |
| 19 | 2-chloro-5-methoxy | Phenol | Red brown. |
| 20 | do | o-Cresol | Buff brown. |
| 21 | do | m-Cresol | Do. |
| 22 | do | 2,5-dimethyl-phenol | Do. |
| 23 | do | 2,6-dimethyl-phenol | Do. |
| 24 | 2-nitro | Phenol | Brown red. |
| 25 | do | o-Cresol | Red brown. |
| 26 | do | m-Cresol | Do. |
| 27 | do | 2-5-dimethyl-phenol | Do. |
| 28 | do | 2,6-dimethyl-phenol | Do. |
| 29 | 2-chloro | m-Cresol | Do. |
| 30 | 3-chloro | o-Cresol | Orange brown. |
| 31 | do | m-Cresol | Do. |
| 32 | 2-methyl | Phenol | Do. |
| 33 | do | o-Cresol | Red brown. |
| 34 | do | m-Cresol | Do. |
| 35 | do | 2,5-dimethyl-phenol | Do. |
| 36 | do | 2,6-dimethyl-phenol | Do. |
| 37 | 2-methoxy | o-Cresol | Do. |
| 38 | do | m-Cresol | Do. |
| 39 | do | 2,5-dimethylphenol | Chocolate brown. |
| 40 | do | 2,6-dimethylphenol | Red brown. |

Example 41

14.3 parts of amino-azobenzene are carefully made into a paste in 50 parts of water and 24 parts by volume of 19.5° Bé hydrochloric acid. 450 parts of water and crushed ice are added and the substance is diazotised at 0.5° C. by the addition in a period of 5 minutes of a solution of 5.2 parts of sodium nitrite in 15 parts of water.

The mixture is stirred for an hour, a little insoluble material is filtered off, and the filtrate is mixed with a solution of 16.8 parts of 1,2-dimethyl-6-hydroxy-indazolium chloride in 200 parts of water. Then 17 parts by volume of concentrated ammonia are slowly added so as to bring the pH to about 8. The diazo derivative has completely reacted. The solid is filtered off, rinsed with a 5% solution of sodium chloride, drained and dried at 50–60° C. 28.3 parts are thus obtained of a dyestuff which gives, on polyacrylic fibres, a bright, full-bodied orange shade, which is very even and has remarkable fastness, especially to light.

A number of examples analogous to the above are summarised in the following table.

| Ex. | R-NH₂ | Shades on acrylic fibers |
|---|---|---|
| 42 | 3'-methyl-4-phenylazo-aniline | Brownish orange. |
| 43 | 3'-nitro-4-phenylazo-aniline | Orange gold. |
| 44 | 4'-nitro-4-phenylazo-aniline | Orange. |
| 45 | 4-phenylazo-2-methyl-aniline | Brownish orange. |
| 46 | 2'-methyl-4-phenylazo-2-methyl-aniline | Scarlet. |
| 47 | 2'-nitro-4-phenylazo-2-methyl-aniline | Orange. |
| 48 | 3'-nitro-4-phenylazo-2-methyl-aniline | Do. |
| 49 | 4'-nitro-4-phenylazo-2-methyl-aniline | Do. |
| 50 | 4-phenylazo-3-methyl-aniline | Brownish orange. |
| 51 | 2'-methyl-4-phenylazo-3-methyl-aniline | Orange. |
| 52 | 3'-methyl-4-phenylazo-3-methyl-aniline | Scarlet. |
| 53 | 2'-methoxy-4-phenylazo-3-methyl-aniline | Brown-orange. |
| 54 | 2'-methoxy-5'-methyl-4-phenylazo-3-methyl-aniline | Orange brown. |
| 55 | 2'-nitro-4-phenylazo-3-methyl-aniline | Orange. |
| 56 | 3'-nitro-4-phenylazo-3-methyl-aniline | Do. |
| 57 | 4'-nitro-4-phenylazo-3-methyl-aniline | Brick red. |
| 58 | 2'-methyl-4-phenylazo-2-methoxy-5-methyl-aniline | Bordeaux. |
| 59 | 3'-methyl-4-phenylazo-2-methoxy-5-methyl-aniline | Do. |
| 60 | 4'-methyl-4-phenylazo-2-methoxy-5-methyl-aniline | Do. |
| 61 | 3'-nitro-4-phenylazo-2-methoxy-5-methyl-aniline | Do. |
| 62 | 4'-nitro-4-phenylazo-2-methoxy-5-methyl-aniline | Do. |

We claim:
1. Basic disazo dyestuffs having one of the general formulae:

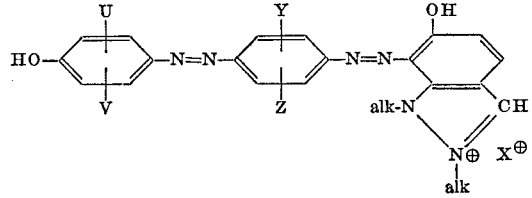

and

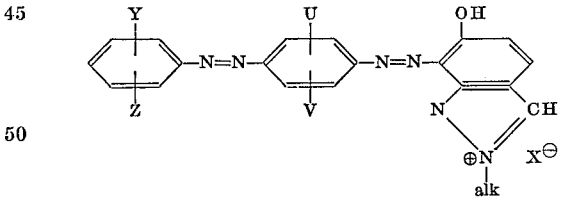

wherein U and V each represent a member selected from the group consisting of the hydrogen atom and the methyl and methoxy groups, Y and Z each represent a member selected from the group consisting of hydrogen and chlorine atoms and the methyl, methoxy and nitro groups, alk represents a member selected from the group consisting of the methyl and ethyl groups and X⊖ represents a monovalent anion.

2. [4-hydroxy-benzene]-(1 azo 4)-[benzene]-(1 azo 7)-[N₁,N₂-dimethyl-6-hydroxy-indazolium] chloride.

3. [4-hydroxy-benzene]-(1 azo 4)-[benzene]-(1 azo 7)-[N₁,N₂-diethyl-6-hydroxy-indazolium] chloride.

4. [4-hydroxy-benzene]-(1 azo 4)-[2-methylbenzene]-(1 azo 7)-[N₁,N₂-dimethyl-6-hydroxy-indazolium] chloride.

5. [4-hydroxy-benzene]-(1 azo 4)-[2-methylbenzene]-(1 azo 7)-[N₁,N₂-diethyl-6-hydroxy-indazolium] chloride.

6. 7-(benzene - azo - benzene - azo)-6-hydroxy-N₁,N₂-dimethyl-indazolium chloride.

7. 7-(benzene - azo - benzene - azo)-6-hydroxy-N₁,N₂-diethyl-indazolium chloride.

8. [2-methyl-benzene]-(1 azo 4)-[2-methyl-benzene]-(1 azo 7)-[N₁,N₂-dimethyl-6-hydroxy-indazolium] chloride.

9. [2-methyl-benzene]-(1 azo 4)-[2-methyl-benzene]-(1 azo 7)-[N₁,N₂-diethyl-6-hydroxy-indazolium] chloride.

10. [3-methyl-benzene]-(1 azo 4)-[3-methyl-benzene]-(1 azo 7)-[N₁,N₂-dimethyl-6-hydroxy-indazolium] chloride.

11. [3-methyl-benzene]-(1 azo 4)-[3-methyl-benzene]-(1 azo 7)-[N₁,N₂-diethyl-6-hydroxy-indazolium] chloride.

References Cited

UNITED STATES PATENTS 3,173,907  3/1965  Klingsberg et al. ____ 260—157

CHARLES B. PARKER, *Primary Examiner.*

D. PAPUGA, *Assistant Examiner.*